June 18, 1968 C. S. CHAPMAN, JR., ET AL 3,388,934
HUB AND SMOOTH SHAFT SPRING KEY ARRANGEMENT
Filed Dec. 16, 1965

INVENTORS
Charles S. Chapman, Jr.,
Richard W. Craig,
Kenneth W. Gage, &
Richard W. Smith
BY
George E. Johnson
ATTORNEY

United States Patent Office 3,388,934
Patented June 18, 1968

3,388,934
HUB AND SMOOTH SHAFT SPRING KEY ARRANGEMENT
Charles S. Chapman, Jr., and Richard W. Craig, Grand Blanc, Kenneth W. Gage, Birmingham, and Richard W. Smith, Lansing, Mich., assignors to General Motors Corporation, Detroit, Mich., a corporation of Delaware
Filed Dec. 16, 1965, Ser. No. 514,309
5 Claims. (Cl. 287—52.05)

ABSTRACT OF THE DISCLOSURE

A hub detachably fixed to a smooth intermediate or end portion of a shaft by means of a spring key having a tab extending into the shaft and an elongated portion disposed in a groove of the hub with opposed stops at the ends of the elongated portion of the key engaging the hub.

---

An object of the present invention is to provide an improved and removable fastening arrangement between an end or intermediate smooth portion of a shaft and a hub mounted on the shaft by means of which the shaft and hub may be held against relative rotational or axial movement.

A feature of the invention is a key made of a strip of spring steel reversed upon itself to form a portion with a stop for entering a hole in a smooth surface shaft and a second portion having two opposing stops for engaging opposing surfaces of a hub mounted on the shaft.

This and other features of the invention will now be described in detail in the specification and then pointed out more particularly in the appended claims.

Figure 1:
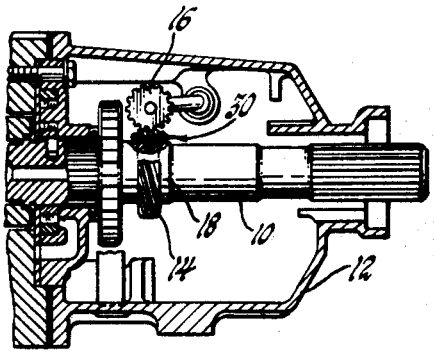
FIGURE 1 is a cross sectional view of a portion of an automobile power transmission unit with a spiral gear fixed to the drive shaft of the unit in accordance with the teaching of the present invention.
Figure 2:
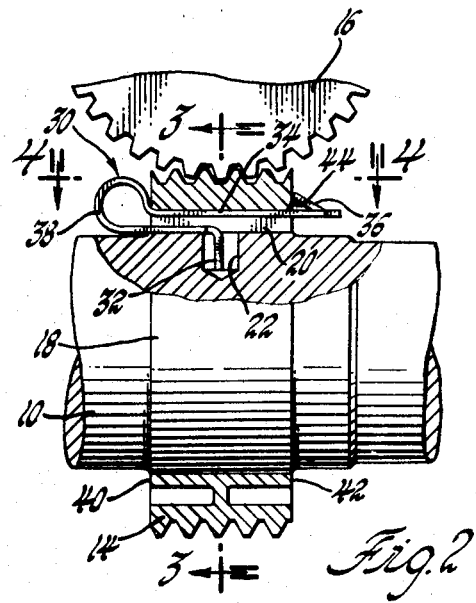
FIGURE 2 is an enlarged view, with portions broken away, of the gear and shaft arrangement of FIGURE 1.
Figure 3:
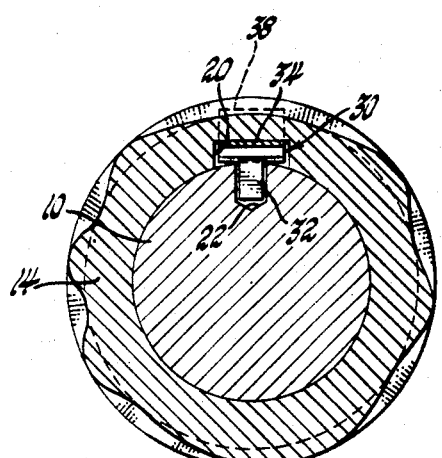
FIGURE 3 is a sectional view looking in the direction of the arrows 3—3 in FIGURE 2.
Figure 4:
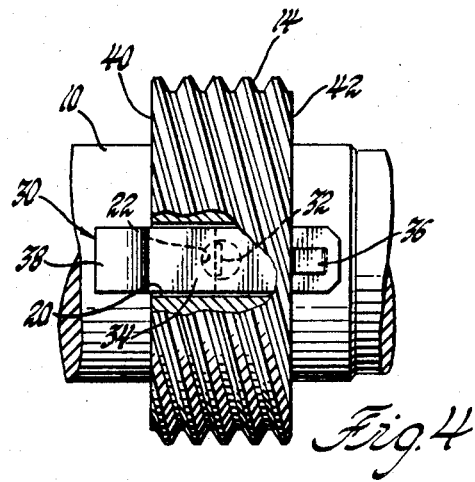
FIGURE 4 is a view looking in the direction of the arrows 4—4 in FIGURE 2, a portion of the gear being broken away better to show the invention.

In FIGURE 1, a drive shaft 10 is enclosed in a transmission housing 12 and is adapted to drive a speedometer by means of a hub or spiral gear 14 fixed to the shaft and a worm gear 16 connected by means of a drive cable to a speedometer (not shown).

The present invention is confined to the joinder of the gear 14 which is termed a "hub" herein to the shaft 10. Obviously, the hub 14 need not be a gear but could be a pulley, wheel, or an annular stop element. The problem solved by the present invention was to provide a hub which could be slipped over a smooth shaft portion and fixed thereto with maximum reliability and minimum cost.

The gear or hub 14 is bored to fit the smooth cylindrical surface 18 of the shaft 10 and it bears a through groove 20 facing the shaft. A hole 22 is drilled in the shaft 10.

Figure 5:
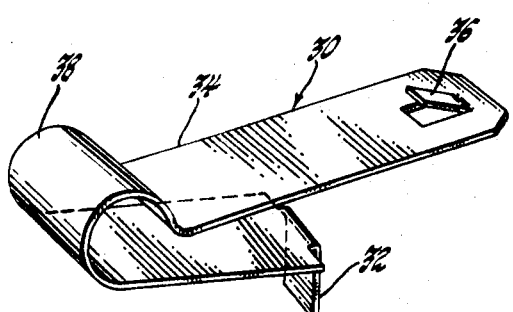
FIGURE 5 is a perspective view of a spring key used in the gearshaft assembly of FIGURES 1 to 4 inclusive.

Interposed between the shaft 10 and the hub 14 is a spring key 30 which is made of a strip of spring steel bent into the form shown in FIGURE 5 when released. One portion of the key is made with a tab 32 of a width less than the diameter of the shaft hole 22. One other and an elongated portion 34 of the key is made to fit within the groove 20 and this portion has a tab or stop 36 struck up near one end and a loop or stop 38 formed at the other end. The tab 32 is in a plane extending between the loop 38 and the tab 36.

To join the hub 14 to the shaft 10, the key 30 is so placed on the shaft that the key tab 32 extends into the hole 22. The key portion 34 is then depressed toward the shaft by a direct application of force and/or the cam action of the hub 14 as the latter is slipped along the shaft and over the up-struck tab 36. The distance between the loop 38 and the released tab 36 is made substantially equal to the distance between opposed surfaces 40 and 42 of the hub. A small cut-out 44 may be made on the hub to facilitate the snug fitting of the hub between the two stops 36 and 38. Depression of the tab 36 permits removal of the hub.

We claim:
1. A hub, a smooth cylindrical shaft portion and a spring key in combination, said hub fitting the said shaft portion and having a groove therein open at both ends, said shaft portion having a radially inwardly extending hole therein, said spring key being a strip of steel reversed upon itself with a radially inwardly extending tab at one portion of said strip in said shaft hole and two opposing stop means in one other portion of said strip engaging said hub on opposite sides thereof, and said other portion being in said groove; said one portion and said other portion being radially spaced from each other a distance at least equal to the radial height of one of said stop means.

2. A combination as set forth in claim 1, the width of said tab being slightly less than the diameter of said shaft hole and considerably less than the overall width of said strip.

3. A combination as set forth in claim 1, the said two opposing stop means being a loop joining said strip portions and a second tab stuck up from said strip.

4. A combination as set forth in claim 1, one of said two opposing stop means being a loop joining the two said portions with the width of said loop engaging a side surface of said hub.

5. A combination as set forth in claim 1, said tab being in a plane extending between said two stops.

References Cited

UNITED STATES PATENTS

| | | | |
|---|---|---|---|
| 329,861 | 11/1885 | Stark | 85—8.3 X |
| 1,387,172 | 8/1921 | Postel | 151—8 |
| 2,501,940 | 3/1950 | Hibbard | 306—28 X |
| 2,516,907 | 8/1950 | Penfold | 285—317 X |
| 2,711,801 | 6/1955 | Super et al. | 287—53 X |
| 2,823,932 | 2/1958 | Schigut | 285—194 |
| 3,164,402 | 1/1965 | Jobe | 287—52.05 |
| 3,168,341 | 2/1965 | Beaudet | 285—319 X |

EDWARD C. ALLEN, *Primary Examiner.*

CARL W. TOMLIN, *Examiner.*

D. W. AROLA, *Assistant Examiner.*